US012802847B2

(12) United States Patent
Nakamura

(10) Patent No.: US 12,802,847 B2
(45) Date of Patent: Nov. 17, 2026

(54) METHOD FOR PRODUCING INSULATOR-COATED SOFT MAGNETIC POWDER, INSULATOR-COATED SOFT MAGNETIC POWDER, DUST CORE, MAGNETIC ELEMENT, ELECTRONIC DEVICE, AND VEHICLE

(71) Applicant: SEIKO EPSON CORPORATION, Tokyo (JP)

(72) Inventor: Atsushi Nakamura, Hachinohe (JP)

(73) Assignee: SEIKO EPSON CORPORATION (JP)

(*) Notice: Subject to any disclaimer, the term of this patent is extended or adjusted under 35 U.S.C. 154(b) by 847 days.

(21) Appl. No.: 18/184,362

(22) Filed: Mar. 15, 2023

(65) Prior Publication Data

US 2023/0298813 A1 Sep. 21, 2023

(30) Foreign Application Priority Data

Mar. 16, 2022 (JP) ................................ 2022-041092

(51) Int. Cl.

| | |
|---|---|
| ***H01F 1/24*** | (2006.01) |
| ***H01F 1/147*** | (2006.01) |
| ***H01F 27/255*** | (2006.01) |
| ***H01F 41/02*** | (2006.01) |

(52) U.S. Cl.

CPC ........... *H01F 1/24* (2013.01); *H01F 1/14766* (2013.01); *H01F 27/255* (2013.01); *H01F 41/026* (2013.01); *H01F 41/0266* (2013.01)

(58) Field of Classification Search

CPC ........................................................ H01F 1/24

See application file for complete search history.

(56) References Cited

U.S. PATENT DOCUMENTS

| | | | | |
|---|---|---|---|---|
| 4,919,734 A * | 4/1990 | Ochiai | H01F 1/24 | 148/306 |
| 5,238,507 A * | 8/1993 | Kugimiya | H01F 1/083 | 75/235 |
| 5,348,800 A | 9/1994 | Moro et al. | | |
| 6,063,303 A * | 5/2000 | Ohtaki | H01F 1/24 | 523/137 |
| 11,901,101 B2 * | 2/2024 | Nakamura | B22F 1/16 | |

(Continued)

FOREIGN PATENT DOCUMENTS

| | | |
|---|---|---|
| JP | H05-109520 A | 4/1993 |
| JP | 2005-248273 A | 9/2005 |

(Continued)

*Primary Examiner* — Liam J Heincer

(74) *Attorney, Agent, or Firm* — Harness, Dickey & Pierce, P.L.C.

(57) ABSTRACT

A method for producing an insulator-coated soft magnetic powder includes: a mixing step of mixing a soft magnetic powder and a ceramic powder to obtain a mixture; a first compression bonding step of pulverizing the ceramic powder by applying mechanical energy to the mixture; and a second compression bonding step of fusing, by applying to the mixture mechanical energy larger than the mechanical energy in the first compression bonding step, the pulverized ceramic powder to surfaces of particles of the soft magnetic powder and obtaining an insulator-coated soft magnetic powder, after the first compression bonding step.

7 Claims, 9 Drawing Sheets

(56) References Cited

U.S. PATENT DOCUMENTS

| | | | | |
|---|---|---|---|---|
| 12,080,456 | B2 * | 9/2024 | Sano | H01F 1/15333 |
| 2005/0242460 | A1 * | 11/2005 | Ishihara | H01F 41/0246 264/122 |
| 2006/0214138 | A1 * | 9/2006 | Ye | H01F 41/0246 252/500 |
| 2010/0323206 | A1 * | 12/2010 | Soma | B22F 1/16 264/319 |
| 2015/0035639 | A1 * | 2/2015 | Nakamura | H01F 17/0013 336/200 |
| 2016/0307679 | A1 | 10/2016 | Taheri et al. | |
| 2017/0148554 | A1 * | 5/2017 | Kudo | H01F 27/24 |
| 2018/0286548 | A1 * | 10/2018 | Nakamura | H01F 27/2823 |
| 2019/0103207 | A1 * | 4/2019 | Sato | C03C 8/04 |
| 2019/0267170 | A1 * | 8/2019 | Nakamura | H01F 1/147 |
| 2019/0333666 | A1 * | 10/2019 | Nakamura | H01F 7/021 |
| 2020/0243235 | A1 * | 7/2020 | Kudo | H01F 1/14766 |
| 2020/0279676 | A1 * | 9/2020 | Orimo | C22C 38/06 |
| 2021/0098164 | A1 * | 4/2021 | Koeda | H01F 1/24 |
| 2021/0154737 | A1 * | 5/2021 | Sano | B22F 1/054 |
| 2021/0280347 | A1 * | 9/2021 | Nakamura | H01F 1/24 |
| 2021/0304932 | A1 * | 9/2021 | Yoshidome | C22C 38/08 |
| 2022/0044859 | A1 * | 2/2022 | Yamamoto | H01F 27/255 |
| 2022/0375664 | A1 * | 11/2022 | Nakamura | C22C 1/08 |
| 2022/0375665 | A1 * | 11/2022 | Sano | H01F 1/15333 |
| 2023/0078743 | A1 * | 3/2023 | Arai | H01F 1/26 428/404 |
| 2023/0290555 | A1 * | 9/2023 | Kudo | H01F 1/15308 |
| 2024/0246144 | A1 * | 7/2024 | Umeda | B22F 1/05 |

FOREIGN PATENT DOCUMENTS

| | | | |
|---|---|---|---|
| JP | 2015-101510 | A | 6/2015 |
| JP | 6048723 | B2 | 12/2016 |
| JP | 2020-111826 | A | 7/2020 |
| JP | 2021-141203 | A | 9/2021 |

* cited by examiner

METHOD FOR PRODUCING INSULATOR-COATED SOFT MAGNETIC POWDER, INSULATOR-COATED SOFT MAGNETIC POWDER, DUST CORE, MAGNETIC ELEMENT, ELECTRONIC DEVICE, AND VEHICLE

The present application is based on, and claims priority from JP Application Serial Number 2022-041092, filed Mar. 16, 2022, the disclosure of which is hereby incorporated by reference herein in its entirety.

BACKGROUND

1. Technical Field

The present disclosure relates to a method for producing an insulator-coated soft magnetic powder, the insulator-coated soft magnetic powder, a dust core, a magnetic element, an electronic device, and a vehicle.

2. Related Art

JP-A-2015-101510 discloses a silica-coated metal nitride particle in which a silica film is formed on a surface of a metal nitride particle. The silica-coated metal nitride particle contains a metal nitride particle and a silica particle having a volume average particle size smaller than that of the metal nitride particle, i.e., 5 nm or more and 200 nm or less. The silica particle is sintered on the surface of the metal nitride particle, and the surface of the metal nitride particle is coated with the silica particle without gaps. By such a sintering operation, the silica particle is bonded to the surface of the metal nitride particle. In addition, the sintering operation is performed under a condition in which the silica particle and the metal nitride particle are not melted, that is, under a condition in which shapes of the original particles can be substantially maintained.

As described above, by using a technique of coating particles containing metal elements with insulating particles such as silica particles, for example, an insulator-coated soft magnetic powder that insulates particles of a soft magnetic powder can be produced. Since the silica particles alone have good insulating properties, the insulator-coated soft magnetic powder can reduce an eddy current as a path between particles.

However, in the silica-coated metal nitride particle described in JP-A-2015-101510, the silica particle maintains an original particle shape. Therefore, strength of the silica film is not sufficient, and peeling, cracking, and the like are likely to occur. Accordingly, when a technique for producing a silica-coated metal nitride particle is used for an insulator-coated soft magnetic powder, there is a problem that when peeling, cracking, and the like of the silica film occur, insulating properties between particles are not sufficiently secured. In addition, such a silica film has a large specific surface area. Therefore, in the insulator-coated soft magnetic powder having such a silica film, an amount of a binder used is increased during production of a dust core. Therefore, magnetic properties of a magnetic element deteriorate.

SUMMARY

A method for producing an insulator-coated soft magnetic powder according to an application example of the present disclosure includes:

- a mixing step of mixing a soft magnetic powder and a ceramic powder to obtain a mixture;
- a first compression bonding step of pulverizing the ceramic powder by applying mechanical energy to the mixture; and
- a second compression bonding step of fusing, by applying to the mixture mechanical energy larger than the mechanical energy in the first compression bonding step, the pulverized ceramic powder to surfaces of particles of the soft magnetic powder and obtaining an insulator-coated soft magnetic powder, after the first compression bonding step.

An insulator-coated soft magnetic powder according to an application example of the present disclosure includes:

- a soft magnetic powder; and
- an insulating film with which surfaces of particles of the soft magnetic powder are coated and which contains a ceramic material, in which
- when an average particle size of the soft magnetic powder is d, a true specific gravity of the soft magnetic powder is ρ, a specific surface area obtained by $s=6/(\rho\cdot d)$ is a theoretical specific surface area s, and an actually measured specific surface area is a measured specific surface area S, the measured specific surface area S is 1.5 times or more and 4.0 times or less the theoretical specific surface area s.

A dust core according to an application example of the present disclosure contains: the insulator-coated soft magnetic powder according to the application example of the present disclosure.

A magnetic element according to an application example of the present disclosure includes: the dust core according to the application example of the present disclosure.

An electronic device according to an application example of the present disclosure includes: the magnetic element according to the application example of the present disclosure.

A vehicle according to an application example of the present disclosure includes: the magnetic element according to the application example of the present disclosure.

DESCRIPTION OF EXEMPLARY EMBODIMENTS

Hereinafter, a method for producing an insulator-coated soft magnetic powder, an insulator-coated soft magnetic powder, a dust core, a magnetic element, an electronic device, and a vehicle according to the present disclosure will be described in detail based on the accompanying drawings.

1. Insulator-Coated Soft Magnetic Powder

Figure 1:
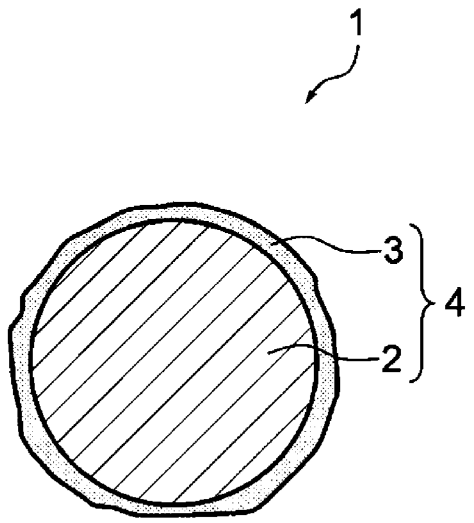
FIG. 1 is a cross-sectional view schematically showing one particle of an insulator-coated soft magnetic powder according to an embodiment.

First, an insulator-coated soft magnetic powder according to an embodiment will be described. FIG. 1 is a cross-sectional view schematically showing one particle of an insulator-coated soft magnetic powder 1 according to the embodiment. In the following description, the one particle of the insulator-coated soft magnetic powder 1 is also referred to as an "insulator-coated soft magnetic particle 4".

The insulator-coated soft magnetic particle 4 shown in FIG. 1 includes a soft magnetic particle 2 and an insulating film 3 provided at a surface of the soft magnetic particle 2. Among these, the soft magnetic particle 2 contains a soft magnetic material to be described later. The insulating film 3 is provided so as to coat the surface of the soft magnetic particle 2, and has an insulating property. The term "coat" as used herein refers to a concept that includes a state in which a part of the surface of the soft magnetic particle 2 is covered, as well as a state in which the entire surface of the soft magnetic particle 2 is covered. In addition, in the following description, an aggregate of the soft magnetic particles 2 is also referred to as a "soft magnetic powder".

As will be described later, a dust core obtained by compacting the insulator-coated soft magnetic powder 1 has a high degree of insulating properties between particles. Accordingly, in a magnetic element including the dust core, an eddy current loss can be reduced.

1.1. Soft Magnetic Particle

Examples of the soft magnetic material constituting the soft magnetic particles 2 include a material containing at least one of Fe, Ni, and Co as a main component, that is, containing 50% or more of these elements in terms of an atomic ratio. In addition, depending on intended properties, the soft magnetic material may contain at least one selected from the group consisting of Cr, Nb, Cu, Al, Mn, Mo, Si, Sn, B, C, P, Ti, and Zr, in addition to the elements serving as the main component. In addition, the soft magnetic material may contain inevitable impurities as long as effects of the embodiment are not impaired. The inevitable impurities are impurities that are unintentionally mixed in a raw material or during production. The inevitable impurities include all elements other than the above-described elements, and examples thereof include O, N, S, Na, Mg, and K.

Specific examples of the soft magnetic material include various alloys, such as Fe-based alloys such as Fe—Si-based alloys (such as silicon steel), Fe—Si—Al-based alloys (such as Sendust), Fe—Ni-based alloys, Fe—Co-based alloys, Fe—Ni—Co-based alloys, Fe—Si—B-based alloys, Fe—Si—B—C-based alloys, Fe—Si—B—Cr—C-based alloys, Fe—Si—Cr-based alloys, Fe—B-based alloys, Fe—P—C-based alloys, Fe—Co—Si—B-based alloys, Fe—Si—B—Nb-based alloys, Fe—Si—B—Nb—Cu-based alloys, Fe—Zr—B-based alloys, Fe—Cr-based alloys, and Fe—Cr—Al-based alloys, Ni-based alloys such as Ni—Si—B-based and Ni—P—B-based alloys, and Co-based alloys such as Co—Si—B-based alloys.

By using the soft magnetic material having such a composition, the insulator-coated soft magnetic particle 4 that has a high magnetic permeability, magnetic flux density, and the like and a low coercive force can be obtained.

A content of the main component described above in the soft magnetic material is preferably 50% or more, and more preferably 70% or more in terms of an atomic ratio. Accordingly, magnetic properties such as a magnetic permeability and a magnetic flux density of the insulator-coated soft magnetic particle 4 can be particularly improved.

A structure constituting the soft magnetic material is not particularly limited, and may be any one of a crystalline structure, a non-crystalline structure (amorphous structure), and a microcrystalline structure (nanocrystalline structure). Among these, the soft magnetic material preferably contains an amorphous or microcrystalline material. By containing the amorphous or microcrystalline material, the coercive force is decreased, which also contributes to reduction in hysteresis loss of the magnetic element. In the soft magnetic material, structures having different crystallinity may be mixed.

Examples of the amorphous material and the microcrystalline material include Fe-based alloys such as Fe—Si—B-based, Fe—Si—B—C-based, Fe—Si—B—Cr—C-based, Fe—Si—Cr-based, Fe—B-based, Fe—P—C-based, Fe—Co—Si—B-based, Fe—Si—B—Nb-based, Fe—Si—B—Nb—Cu-based, and Fe—Zr—B-based alloys, Ni-based alloys such as Ni—Si—B-based and Ni—P—B-based alloys, and Co-based alloys such as Co—Si—B-based alloys.

The composition of the soft magnetic material is specified by the following analysis method.

Examples of the analysis method include iron and steel-atomic absorption spectrometry defined in JIS G 1257:2000, iron and steel-ICP emission spectrometry defined in JIS G 1258:2007, iron and steel-spark discharge emission spectrometry defined in JIS G 1253:2002, iron and steel-fluorescent X-ray spectrometry defined in JIS G 1256:1997, and gravimetric, titration and absorption spectrometric methods defined in JIS G 1211 to JIS G 1237.

Specific examples thereof include a solid emission spectrometer manufactured by SPECTRO, in particular, a spark discharge emission spectrometer, model: SPECTROLAB, type: LAVMB08A, or ICP apparatus CIROS120 type manufactured by Rigaku Corporation.

In particular, when specifying carbon (C) and sulfur (S), an infrared absorption method after combustion in a current of oxygen (combustion in high frequency induction furnace)

defined in JIS G 1211:2011 is also used. Specific examples thereof include a carbon-sulfur analyzer CS-200 manufactured by LECO Corporation.

In particular, when specifying nitrogen (N) and oxygen (O), methods for determination of nitrogen content for an iron and steel defined in JIS G 1228:1997 and general rules for determination of oxygen in metal materials defined in JIS Z 2613:2006 are also used. Specific examples thereof include an oxygen-nitrogen analyzer TC-300/EF-300 manufactured by LECO Corporation.

As the soft magnetic material, a material having a Vickers hardness of 200 or more and 500 or less is preferably used. Accordingly, it is possible to optimize a balance between the hardness of the soft magnetic material and a hardness of a ceramic material described later. As a result, for example, when the insulator-coated soft magnetic powder 1 is produced by a mechanochemical device, it is possible to form the insulating film 3 which is thinner and has a more uniform thickness.

Here, an average particle size of the soft magnetic powder is d [μm], and a true specific gravity of the soft magnetic powder is ρ [g/cm$^3$]. In addition, a specific surface area of the soft magnetic powder obtained by $s=6/(\rho\cdot d)$ is a theoretical specific surface area s [m$^2$/g], and an actually measured specific surface area of the insulator-coated soft magnetic powder 1 is a measured specific surface area S [m$^2$/g]. At this time, the measured specific surface area S is 1.5 times or more and 4.0 times or less the theoretical specific surface area s.

In such an insulator-coated soft magnetic powder 1, the measured specific surface area S is prevented from becoming remarkably larger than the theoretical specific surface area s calculated based on the average particle size d of the soft magnetic powder and the true specific gravity p of the soft magnetic powder. That is, the insulator-coated soft magnetic powder 1 has the measured specific surface area S that is relatively close to the theoretical specific surface area s when the particles of the soft magnetic powder are assumed to be true spheres. Therefore, since an area of the insulator-coated soft magnetic powder 1 covered with the insulating film 3 is small, it is possible to reduce an amount of a binder used for binding the insulator-coated soft magnetic particles 4 to each other when a dust core is produced. Accordingly, a magnetic element having excellent magnetic properties such as a magnetic permeability and a saturation magnetic flux density can be implemented. In addition, since a shape of the insulator-coated soft magnetic powder 1 as described above is close to a true sphere, a filling rate during compaction becomes high. From this viewpoint, a magnetic element having excellent magnetic properties can also be implemented.

The average particle size d of the soft magnetic powder is preferably 1 μm or more and 50 μm or less, more preferably 2 μm or more and 15 μm or less, and still more preferably 3 μm or more and 10 μm or less. Accordingly, since a path of an in-particle eddy current flowing in the insulator-coated soft magnetic particle 4 is shortened, a magnetic element in which an eddy current loss in a high frequency region is small can be implemented. In addition, when the average particle size d of the soft magnetic powder is within the above range, a filling property during compaction becomes high, and thus magnetic properties of the magnetic element can be improved.

The average particle size d is obtained from a cumulative distribution curve obtained by measuring a volume-based particle size distribution of the soft magnetic powder by, for example, a laser diffraction method. Specifically, in the cumulative distribution curve, a particle diameter at a cumulative value of 50% from a small diameter side is defined as the average particle size d. Examples of a measuring device include Microtrack HRA9320-X100 manufactured by Nikkiso Co., Ltd.

When the average particle size d of the soft magnetic powder is less than the lower limit value, aggregation is likely to occur, and therefore, there is a concern that the filling property during compaction is lowered, and the magnetic properties of the magnetic element are lowered. On the other hand, when the average particle size d of the soft magnetic powder exceeds the upper limit value, the path of the in-particle eddy current becomes long, and thus the eddy current loss derived from the in-particle eddy current may increase. In addition, the filling property during compaction may be lowered, and the magnetic properties of the magnetic element may be lowered.

The measured specific surface area S is preferably 2.0 times or more and 3.8 times or less the theoretical specific surface area s, and more preferably 2.5 times or more and 3.6 times or less the theoretical specific surface area s.

The measured specific surface area S is obtained by a so-called BET method. Examples of the measuring device include a BET specific surface area measuring device HM1201-010 manufactured by Mountech Co., Ltd., and an amount of a sample is 5 g.

The measured specific surface area S of the insulator-coated soft magnetic powder 1 is preferably 0.15 m$^2$/g or more and 0.29 m$^2$/g or less. The true specific gravity p of the soft magnetic powder is preferably 7.3 g/cm$^3$ or more and 8.3 g/cm$^3$ or less.

1.2. Insulating Film

The insulating film 3 covers the surfaces of the soft magnetic particle 2. The insulating film 3 contains a ceramic material. A volume proportion of the ceramic material in the insulating film 3 is preferably 60% or more, and more preferably 80% or more. The ceramic material has a particularly high insulating property as compared with, for example, a glass material or a resin material, and thus contributes to improving the insulating properties between the insulator-coated soft magnetic particles 4.

The insulating film 3 is preferably a film formed by melting the ceramic material and then solidifying the ceramic material on the surface of the soft magnetic particle 2, that is, a film formed by fusing the ceramic material. In this case, the insulating film 3 is formed so as to follow irregularities present on the surface of the soft magnetic particle 2, and has a good adhesion force. Therefore, in the insulator-coated soft magnetic powder 1, the occurrence of peeling, cracking, and the like of the insulating film 3 during compaction can be prevented. Accordingly, it is possible to implement a magnetic element in which an eddy current loss due to an inter-particle eddy current is reduced.

Whether the ceramic material is melted can be determined by magnifying and observing a cross section of the insulating film 3 using an electron microscope and the like to determine whether the cross section has a homogeneous structure, specifically, whether a large number of traces of ceramic particles used for forming the insulating film 3 remain. When there is almost no trace of the ceramic particles, it is recognized that the cross section has a homogeneous structure. If necessary, an energy dispersive x-ray spectroscopy (EDX) analysis may be used.

Examples of the ceramic material include oxide-based ceramics such as aluminum oxide, magnesium oxide, titanium oxide, zirconium oxide, silicon oxide, iron oxide, potassium oxide, sodium oxide, calcium oxide, chromium oxide, and niobium oxide, nitride-based ceramics such as boron nitride and silicon nitride, and silicon carbide. Among these, one type or a mixture of two or more types is used.

Among these, as the ceramic material, aluminum oxide, titanium oxide, zirconium oxide, or silicon oxide is preferably used, and aluminum oxide is more preferably used. Since these ceramic materials have particularly high insulating properties and weather resistance, the insulating properties between the insulator-coated soft magnetic particles 4 can be particularly improved, and deterioration of the soft magnetic particles 2 due to oxidation, corrosion, and the like can be more satisfactorily prevented.

As the ceramic material, a material having a Vickers hardness of 1000 or more and 3300 or less is preferably used, and a material having a Vickers hardness of 1500 or more and 3000 or less is more preferably used. By using such a ceramic material, it is possible to obtain the insulating film 3 which is not easily cut even during compaction. Therefore, since compaction and molding at a high pressure is possible, a magnetic element having excellent magnetic properties can be implemented.

An average thickness of the insulating film 3 is preferably 5 nm or more and 300 nm or less, more preferably 10 nm or more and 250 nm or less, and still more preferably 20 nm or more and 200 nm or less. Accordingly, it is possible to further improve an insulating property of the insulating film 3 and a filling property of the soft magnetic particle 2 during compaction. When the average thickness of the insulating film 3 is less than the lower limit value, the insulating property and heat resistance of the insulating film 3 may be insufficient. On the other hand, when the average thickness of the insulating film 3 exceeds the upper limit value, the insulating film 3 may be easily peeled off, or the filling property of the soft magnetic particle 2 during compaction may be lowered.

The average thickness of the insulating film 3 is a value obtained by magnifying and observing the cross section of the insulating film 3 and averaging the thicknesses of the insulating film 3 measured on an image at 10 or more portions. For the magnification observation, for example, a scanning transmission electron microscope is used.

The insulating film 3 may contain a material having an insulating property other than the ceramic material as necessary. Examples of such a material include $Bi_2O_3$, $B_2O_3$, ZnO, SnO, $P_2O_5$, PbO, $Li_2O$, $Na_2O$, $K_2O$, SrO, BaO, $Gd_2O_3$, $Y_2O_3$, $La_2O_3$, and $Yb_2O_3$, one or more of these materials are used.

1.3. Properties of Insulator-Coated Soft Magnetic Powder

A withstand voltage and an insulation resistance value of a test piece obtained by using the insulator-coated soft magnetic powder 1 are measured as follows.

First, the insulator-coated soft magnetic powder 1, an epoxy resin as a binder, and toluene as a solvent are mixed to obtain a mixture. An addition amount of the epoxy resin is 2% by mass of an addition amount of the insulator-coated soft magnetic powder 1. Next, the obtained mixture is stirred and then dried to obtain a massive dried body. Next, the dried body is sieved with a sieve having an opening of 400 μm and pulverized to obtain a granulated powder. The obtained granulated powder is dried at 50° C. for 1 hour. Next, the dried granulated powder is pressurized at 294 MPa (3 $t/cm^2$) to obtain a test piece.

Next, the obtained test piece is disposed in an alumina cylinder having an inner diameter of 8 mm, and then electrodes made of brass are disposed at both ends of the cylinder. Thereafter, a voltage of 50 V is applied between the electrodes at 25° C. for 2 seconds while a pressure of 40 $kgf/cm^2$ is applied between the electrodes at both ends of the cylinder by using a digital force gauge. At this time, an electric resistance value between the electrodes is measured by a digital multimeter, and the presence or absence of dielectric breakdown is confirmed.

Next, the voltage applied between the electrodes is increased to 100 V and held for 2 seconds. Then, the electric resistance value between the electrodes at this time is measured, and the presence or absence of dielectric breakdown is confirmed.

Next, while the voltage applied between the electrodes is increased by 50 V each time from 150 V, the electric resistance value between the electrodes is measured each time, and the presence or absence of dielectric breakdown is confirmed. Then, the boosting by 50 V each time and the measurement of the electric resistance value are repeated until the dielectric breakdown occurs, and a maximum voltage at which the dielectric breakdown does not occur is defined as the withstand voltage of the test piece. When the dielectric breakdown does not occur even when the voltage is increased to 1000 V, the measurement is ended at 1000 V.

The withstand voltage of the test piece measured by the above method is preferably 500 V or more, and more preferably 700 V or more. The insulation resistance value of the test piece when 100 V is applied is preferably 1000 MΩ or more, and more preferably 10000 MΩ or more. By using the insulator-coated soft magnetic powder 1 that satisfies such properties, it is possible to implement a magnetic element in which an eddy current loss due to an inter-particle eddy current is reduced.

A magnetic permeability of the test piece obtained using the insulator-coated soft magnetic powder 1 is measured as follows.

First, the insulator-coated soft magnetic powder 1, an epoxy resin as a binder, and toluene as a solvent are mixed to obtain a mixture. An addition amount of the epoxy resin is 2% by mass of the addition amount of the insulator-coated soft magnetic powder 1. Next, the obtained mixture is stirred and then dried to obtain a massive dried body. Next, the dried body is sieved with a sieve having an opening of 400 μm and pulverized to obtain a granulated powder. The obtained granulated powder is dried at 50° C. for 1 hour. Next, a mold is filled with the dried granulated powder and molding is performed under the following molding conditions to obtain a test piece.

Molding method: press molding
Shape of molded product: ring shape
Dimensions of molded product: outer diameter 14 mm, inner diameter 8 mm, thickness 3 mm
Molding pressure: 3 $t/cm^2$ (294 MPa)

Next, an effective magnetic permeability obtained from a self-inductance of a closed magnetic core coil is measured for the obtained test piece, and the effective magnetic permeability is defined as the magnetic permeability of the test piece. For the measurement of the magnetic permeability, for example, an impedance analyzer such as 4194A manufactured by Agilent Technologies, Inc. is used, and a measurement frequency is set to 1 MHz. A winding number of an exciting coil is 7 times, and a wire diameter of a winding is 0.6 mm.

The magnetic permeability of the test piece measured by the above method is preferably 31 or more when a Fe—Si—Cr-based soft magnetic material is used as the constituent material of the soft magnetic powder. Accordingly, a magnetic element having high magnetic properties can be implemented.

1.4. Effects of Insulator-Coated Soft Magnetic Powder According to Embodiment

As described above, the insulator-coated soft magnetic powder 1 according to the embodiment includes the soft magnetic powder and the insulating film 3 with which the surfaces of the particles of the soft magnetic powder are coated and which contains the ceramic material. The average particle size of the soft magnetic powder is d, the true specific gravity of the soft magnetic powder is ρ, the specific surface area obtained by $s=6/(\rho\cdot d)$ is the theoretical specific surface area s, and the actually measured specific surface area is the measured specific surface area S. At this time, the measured specific surface area S is 1.5 times or more and 4.0 times or less the theoretical specific surface area s.

According to such a configuration, the insulator-coated soft magnetic powder 1, which is controlled such that the measured specific surface area S is not remarkably larger than the theoretical specific surface area s, is obtained. In such an insulator-coated soft magnetic powder 1, the insulating film 3 is formed to be thin and uniform in thickness. Therefore, each of the insulator-coated soft magnetic particles 4 has a good insulating property derived from the ceramic material. Since such an insulator-coated soft magnetic powder 1 has the small measured specific surface area S, it is possible to reduce the amount of the binder used for binding the insulator-coated soft magnetic particles 4 to each other when the insulator-coated soft magnetic powder 1 is subjected to the production of the dust core. Accordingly, a magnetic element having high magnetic properties such as a magnetic permeability and a saturation magnetic flux density can be implemented. Further, since the shape of the insulator-coated soft magnetic powder 1 as described above is close to a true sphere, the filling rate during compaction becomes high. From this viewpoint, a magnetic element having high magnetic properties can also be implemented.

When a test piece (withstand voltage measurement test piece) is obtained by mixing 2% by mass of an epoxy resin to the insulator-coated soft magnetic powder 1 and pressurizing the mixture at 294 MPa (3 t/cm$^2$), the withstand voltage of the test piece is preferably 500 V or more. The insulation resistance value of the test piece when 100 V is applied is preferably 1000 MΩ or more.

In such an insulator-coated soft magnetic powder 1, the insulating properties between the insulator-coated soft magnetic particles 4 are particularly high. Therefore, it is possible to implement a magnetic element in which an eddy current loss due to an inter-particle eddy current is reduced.

When the constituent material of the soft magnetic powder is a Fe—Si—Cr-based soft magnetic material, and when a test piece (magnetic permeability measurement test piece) is obtained by mixing 2% by mass of an epoxy resin to the insulator-coated soft magnetic powder 1 and pressurizing the mixture at 294 MPa (3 t/cm$^2$), the magnetic permeability of the test piece is preferably 31 or more.

The insulator-coated soft magnetic powder 1 having such a soft magnetic powder contributes to implementation of a magnetic element having excellent magnetic properties.

2. Method for Producing Insulator-Coated Soft Magnetic Powder

Next, a method for producing the insulator-coated soft magnetic powder according to the embodiment will be described.

Figure 2:
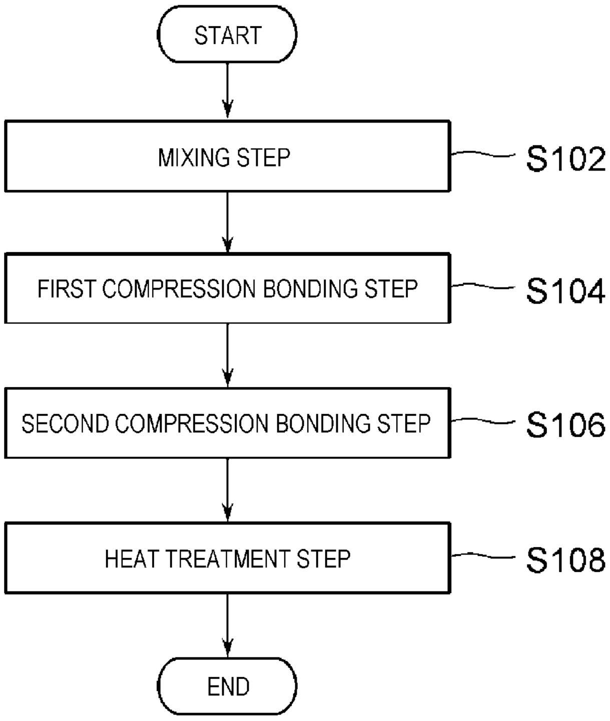
FIG. 2 is a process diagram showing a method for producing the insulator-coated soft magnetic powder according to the embodiment.

FIG. 2 is a process diagram showing the method for producing the insulator-coated soft magnetic powder according to the embodiment. FIGS. 3 to 10 are schematic views showing the method for producing the insulator-coated soft magnetic powder shown in FIG. 2.

Figure 3:
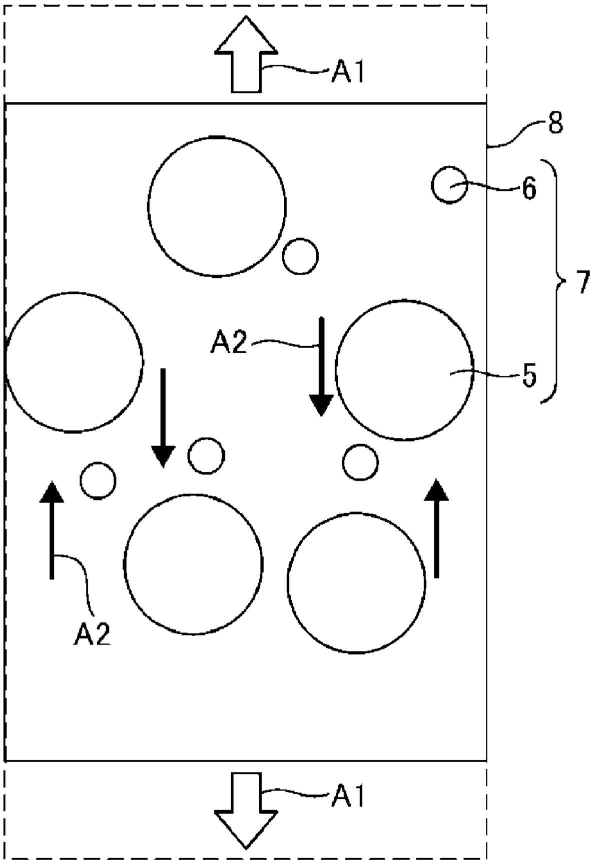
FIG. 3 is a schematic view showing the method for producing the insulator-coated soft magnetic powder shown in FIG. 2.

The method for producing the insulator-coated soft magnetic powder shown in FIG. 2 includes a mixing step S102, a first compression bonding step S104, a second compression bonding step S106, and a heat treatment step S108. In the mixing step S102, as shown in FIG. 3, a soft magnetic powder 5 and a ceramic powder 6 are mixed to obtain a mixture 7. In the first compression bonding step S104, the ceramic powder 6 is pulverized by applying mechanical energy to the mixture 7. In the second compression bonding step S106, mechanical energy larger than that in the first compression bonding step S104 is applied to the mixture 7 to fuse the pulverized ceramic powder 6 to surfaces of particles of the soft magnetic powder 5. Accordingly, the insulator-coated soft magnetic powder 1 is obtained. In the heat treatment step S108, the insulator-coated soft magnetic powder 1 is subjected to a heat treatment to remove or reduce strains remaining in the insulator-coated soft magnetic powder 1.

2.1. Mixing Step

In the mixing step S102, the soft magnetic powder 5 and the ceramic powder 6 are mixed to obtain the mixture 7. Specifically, for example, as shown in FIG. 3, the mixture 7 is obtained by charging the soft magnetic powder 5 and the ceramic powder 6 into a container 8.

The soft magnetic powder 5 is made of the above-described soft magnetic material.

The soft magnetic powder 5 may be a powder produced by any method. Examples of the production method include various atomization methods such as a water atomization method, a gas atomization method, and a rotary water flow atomization method, a reduction method, a carbonylation method, and a pulverization method. Among these, the atomization method is preferably used. That is, the soft magnetic powder 5 is preferably an atomized powder. The atomized powder is minute, has high sphericity, and has a high production efficiency. In addition, in particular, since a water atomized powder or a rotary water flow atomized powder is produced by contact between a molten metal and water, there is a thin oxide film on a surface thereof. This oxide film can serve as a base of the insulating film 3. Accordingly, adhesion between the soft magnetic particle 2 and the insulating film 3 can be improved.

An average particle size of the soft magnetic powder 5 is preferably 1 μm or more and 50 μm or less, more preferably 2 μm or more and 15 μm or less, and still more preferably 3 μm or more and 10 μm or less. Accordingly, since a path of an in-particle eddy current flowing in the insulator-coated soft magnetic particle 4 is shortened, a magnetic element in which an eddy current loss in a high frequency region is small can be implemented. In addition, when the average particle size of the soft magnetic powder 5 is within the above range, a filling property during compaction becomes high, and thus magnetic properties of the magnetic element can be improved.

The average particle size of the soft magnetic powder 5 is obtained from a cumulative distribution curve obtained by measuring a volume-based particle size distribution of the soft magnetic powder 5 by, for example, a laser diffraction method. Specifically, in the cumulative distribution curve, a particle diameter at a cumulative value of 50% from a small diameter side is defined as the average particle size. Examples of a measuring device include Microtrack HRA9320-X100 manufactured by Nikkiso Co., Ltd.

The ceramic powder 6 is made of the above-described ceramic material.

An average particle size of the ceramic powder 6 may be larger than the average particle size of the soft magnetic powder 5, and is preferably smaller than the average particle size of the soft magnetic powder 5. Accordingly, it is easier for the ceramic powder 6 to be distributed around the particles of the soft magnetic powder 5 in the mixture 7. As a result, in the first compression bonding step S104 described later, the ceramic powder 6 is easily sandwiched between the particles of the soft magnetic powder 5 and the container and between the particles of the soft magnetic powder 5, and the ceramic powder 6 is easily pulverized.

The average particle size of the ceramic powder 6 is preferably 0.005% or more and 1.0% or less, more preferably 0.01% or more and 0.5% or less, and still more preferably 0.03% or more and 0.1% or less of the average particle size of the soft magnetic powder 5. By setting the average particle size of the ceramic powder 6 within the above range, even when the surfaces of the particles of the soft magnetic powder 5 have irregularities, an appropriate impact is easily applied to the ceramic powder 6 in the first compression bonding step S104. Accordingly, the ceramic powder 6 is more easily pulverized, and finally, the insulating film 3 having a uniform film thickness is more easily formed.

2.2. First Compression Bonding Step

In the first compression bonding step S104, the ceramic powder 6 is pulverized by applying mechanical energy to the mixture 7. In addition, the pulverized ceramic powder 6 is temporarily compression-bonded to the surfaces of the particles of the soft magnetic powder 5. The temporary compression bonding means that the ceramic powder 6 or the pulverized product thereof adheres to the surface of the soft magnetic powder 5 almost without being melted. Therefore, when a particle cross section of the soft magnetic powder 5, after the ceramic powder 6 and the like is temporarily compression-bonded to the surfaces of the particles of the soft magnetic powder 5, is magnified and observed, an area proportion of the melted ceramic material is less than 50%, and preferably 30% or less.

In the present step, for example, a mechanochemical device is used. Since this device can apply mechanical energy, the mixture 7 can be treated by a so-called mechanochemical method. The mechanochemical device can be roughly divided into an accommodation object collision type device and an accommodation object compression type device depending on a principle of applying mechanical energy. Examples of the accommodation object collision type device include a ball mill, a planetary mill, a planetary ball mill, a jet mill, a Jacobson mill, a vibration mill, a vibro-mill, and an acoustic resonance mixer. Examples of the accommodation object compression type device include ANGMILL (registered trademark), MIX MULLER (registered trademark), MECHANO FUSION (registered trademark), HYBRIDIZATION (registered trademark), NOBILTA (registered trademark), and NOBILTA (registered trademark) Bercom. The present step may be a step of applying mechanical energy by an operation that does not include a treatment using a mechanochemical method, for example, an operation such as blasting.

Among these, in the present step, an accommodation object collision type device is preferably used. In the accommodation object collision type device, appropriate mechanical energy can be applied to the mixture 7 by a motion of an accommodation object. In this case, when a medium such as a rod or a ball is not used, the mechanical energy applied to the mixture 7 can be reduced, and melting of the ceramic powder 6 can be prevented.

Figure 4:
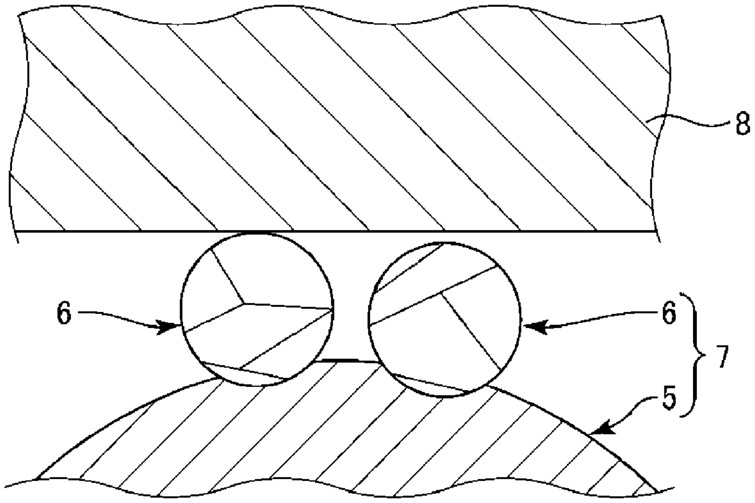
FIG. 4 is a schematic view showing the method for producing the insulator-coated soft magnetic powder shown in FIG. 2.
Figure 5:
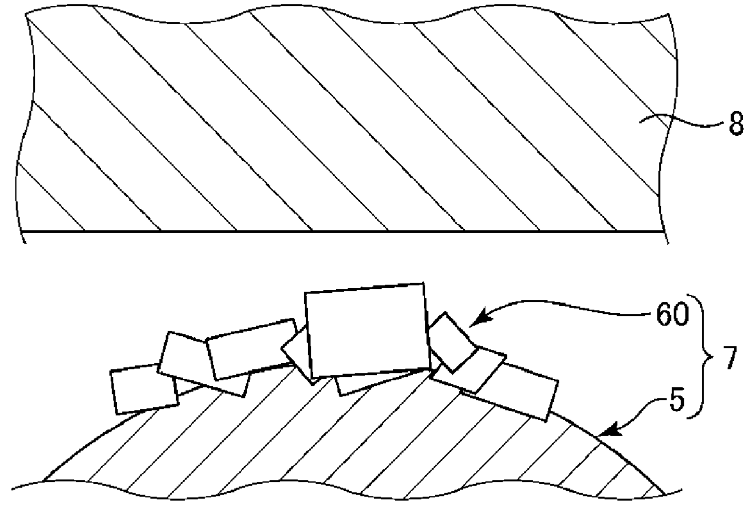
FIG. 5 is a schematic view showing the method for producing the insulator-coated soft magnetic powder shown in FIG. 2.

FIG. 3 is a diagram schematically showing a state in which the mechanical energy is applied to the mixture 7 by the accommodation object collision type device. When the container 8 reciprocates as indicated by arrows A1 in FIG. 3, the mixture 7 accommodated in the container 8 vibrates as indicated by arrows A2. The mixture 7 collides with the container 8 or the mixtures 7 collide with each other. That is, it can be said that the accommodation object collision type device shown in FIG. 3 is a device that performs an operation of applying an acceleration to the mixture 7 and applies an impact due to an inertial force. By using such a device, cracks can be formed in the ceramic powder 6 as shown in FIG. 4. FIG. 4 shows a state in which the ceramic powder 6 collides with an inner wall of the container 8 and cracks are formed. When an impact is further applied in this state, as shown in FIG. 5, the ceramic powder 6 is pulverized and becomes fine. Then, a formed pulverized product 60 is temporarily compression-bonded to the surfaces of the particles of the soft magnetic powder 5.

When the accommodation object collision type device is accompanied by the vibration of the container, a vibration frequency thereof is preferably 10 Hz or more and 100 Hz or less, and more preferably 20 Hz or more and 80 Hz or less. Accordingly, mechanical energy can be efficiently applied to the mixture 7, and thus a time required for the present step can be shortened.

A magnitude of the acceleration applied to the mixture 7 with the vibration is preferably 30 $m/s^2$ (3 G) or more and 200 $m/s^2$ (20 G) or less, and more preferably 50 $m/s^2$ (5 G) or more and 150 $m/s^2$ (15 G) or less. Accordingly, appropriate mechanical energy can be applied to the mixture 7, and it is possible to prevent melting of the ceramic powder 6 and prevent the ceramic powder 6 from being unable to be pulverized.

On the other hand, in the present step, an accommodation object compression type device may be used. In the accommodation object compression type device, mechanical energy can be applied to the mixture 7 by applying a load for compressing an accommodation object using a compressor. In this case, the load applied to the mixture 7 is preferably 30 N or more and 100 N or less.

The present step may be performed in a wet manner, and is preferably performed in a dry manner. Accordingly, moisture and the like is less likely to adhere to the mixture 7, and oxidation, corrosion, and the like of the soft magnetic powder 5 can be prevented. Further, it is possible to perform the step in an inert gas atmosphere, and it is possible to more reliably prevent oxidation and the like of the soft magnetic powder 5.

If necessary, the ceramic powder 6 may be subjected to a surface treatment as a pretreatment. Examples of the surface treatment include a hydrophobic treatment. By performing the hydrophobic treatment, adsorption of moisture to the ceramic powder 6 is prevented. Accordingly, oxidation, corrosion, and the like of the soft magnetic powder 5 can be prevented. In addition, aggregation of the ceramic powder 6 can be prevented by the hydrophobic treatment.

Examples of the hydrophobic treatment include trimethylsilylation, and arylation such as phenylation. For the trimethylsilylation, for example, a trimethylsilylating agent such as trimethylchlorosilane is used. For the arylation, for example, an arylating agent such as an aryl halide is used.

2.3. Second Compression Bonding Step

In the second compression bonding step S106, mechanical energy larger than that in the first compression bonding step S104 is applied to the mixture 7.

In the present step, for example, the mechanochemical device described above is also used. Among these devices, in the present step, an accommodation object compression type device is particularly preferably used. However, the present step may also be a step of applying mechanical energy by an operation that does not include a treatment using a mechanochemical method, for example, an operation such as blasting.

Figure 6:
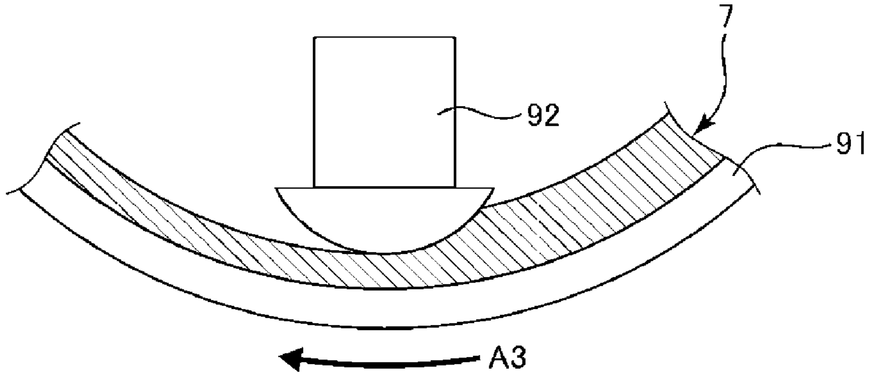
FIG. 6 is a schematic view showing the method for producing the insulator-coated soft magnetic powder shown in FIG. 2.
Figure 7:
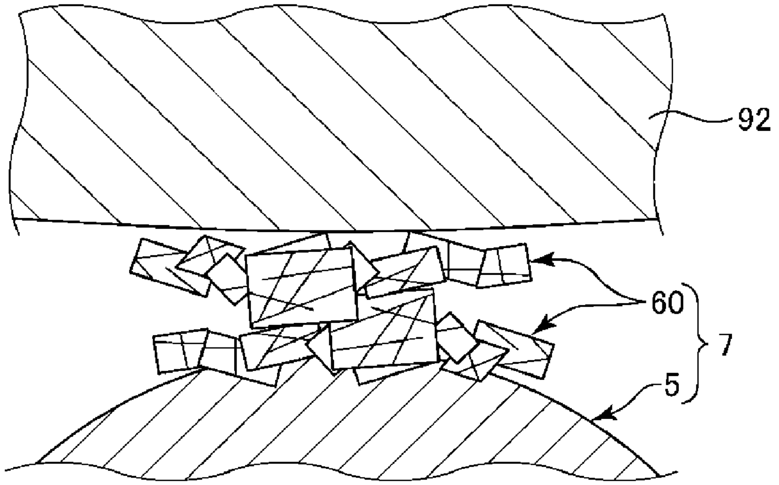
FIG. 7 is a schematic view showing the method for producing the insulator-coated soft magnetic powder shown in FIG. 2.
Figure 8:
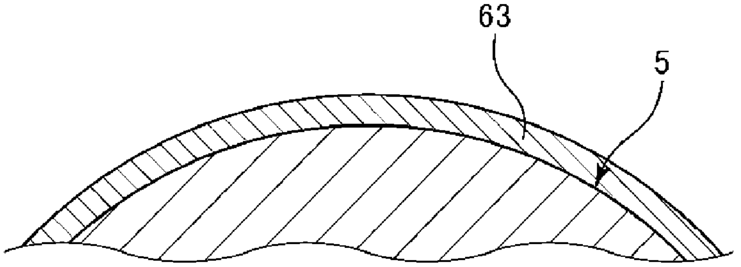
FIG. 8 is a schematic view showing the method for producing the insulator-coated soft magnetic powder shown in FIG. 2.

FIG. 6 is a diagram schematically showing a state in which the mechanical energy is applied to the mixture 7 by an accommodation object compression type device. The accommodation object compression type device shown in FIG. 6 includes a container 91 and a head 92 accommodated in the container 91. When the container 91 is rotated in a direction of an arrow A3 in a state in which the mixture 7 subjected to the first compression bonding step S104 is charged into the container 91, the mixture 7 is sandwiched between an inner wall surface of the container 91 and the head 92 and receives a shearing force. That is, the accommodation object compression type device shown in FIG. 6 can perform an operation of applying the shearing force to the mixture 7. Accordingly, as shown in FIG. 7, the pulverized product 60 is further pulverized. Then, the pulverized product 60 is further melted, and as shown in FIG. 8, a molten material 63 covering the surfaces of the particles of the soft magnetic powder 5 is formed, and the molten material 63 is compression-bonded. Accordingly, the insulating film 3 shown in FIG. 1 is obtained. The compression bonding means that the ceramic powder 6 or the pulverized product 60 thereof melts and adheres to the surface of the soft magnetic powder 5. Therefore, when the particle cross section of the soft magnetic powder 5, after the ceramic powder 6 and the like are compression-bonded to the surfaces of the particles of the soft magnetic powder 5, is magnified and observed, an area proportion of the melted ceramic material is 50% or more, and preferably 70% or more. Accordingly, the insulator-coated soft magnetic powder 1 shown in FIG. 1 is obtained.

Since the molten material 63 has undergone melting of the ceramic material, a surface of the molten material 63 is likely to be smooth. Therefore, according to the above method, the insulator-coated soft magnetic powder 1 having a small specific surface area can be produced.

In the present step, mechanical energy is applied in a state in which the pulverized product 60 is temporarily compression-bonded, and the molten material 63 is formed. By dividing a process of applying mechanical energy into two processes, the molten material 63 can be formed to be thin and uniform in thickness. For example, when the molten material 63 is to be formed without temporary compression bonding, the thickness of the molten material 63 tends to be non-uniform. In addition, when the surfaces of the particles of the soft magnetic powder 5 have irregularities, recesses cannot be sufficiently filled with the molten material 63. Accordingly, the specific surface area of the insulator-coated soft magnetic powder 1 increases. On the other hand, when only the temporary compression bonding is performed, the molten material 63 is not formed.

On the other hand, by the first compression bonding step S104 and the second compression bonding step S106, the molten material 63 having a uniform thickness can be formed. In addition, even when there are irregularities on the surfaces of the particles of the soft magnetic powder 5, the recesses are easily filled with the molten material 63. As a result, the insulator-coated soft magnetic powder 1 having a small specific surface area can be efficiently produced.

When the accommodation object compression type device is used in the present step, the load applied to the mixture 7 is preferably more than 100 N and 800 N or less.

On the other hand, the accommodation object collision type device may be used in the present step, and in this case, the magnitude of the acceleration applied to the mixture 7 with the vibration is preferably 150 $m/s^2$ (15 G) or more and 1000 $m/s^2$ (100 G) or less.

The mechanical energy applied to the mixture 7 in the present step is not particularly limited as long as the pulverized product 60 can be melted, and is, for example, preferably $1\times10^2$ [J/g] or more and $1\times10^4$ [J/g] or less.

The mechanical energy applied to the mixture 7 in the present step is preferably 1.1 or more, and more preferably 5.0 or more, when the mechanical energy applied to the mixture 7 in the first compression bonding step S104 is 1. Accordingly, energy to be applied can be balanced, the melting of the ceramic material can be prevented in the first compression bonding step S104, and the ceramic material can be easily melted in the second compression bonding step S106. The mechanical energy can be compared by calculating, based on an acceleration or a compressive load, an amount of heat generated in the mixture 7. In consideration of the balance of the mechanical energy applied to the mixture 7, it is preferable to use the accommodation object collision type device in the first compression bonding step S104, and to use the accommodation object compression type device in the present step.

The present step may be performed in a wet manner, and is preferably performed in a dry manner. Accordingly, moisture and the like are less likely to adhere to the mixture 7, and oxidation, corrosion, and the like of the soft magnetic powder 5 can be prevented. Further, it is possible to perform the step in an inert gas atmosphere, and it is possible to more reliably prevent oxidation and the like of the soft magnetic powder 5.

The ceramic powder 6 used in the present production method may contain secondary particles formed by aggregation of a plurality of primary particles. When the ceramic powder 6 contains secondary particles, an action of filling the recesses on the surfaces of the particles of the soft magnetic powder 5 with the molten material 63 is more easily exhibited.

Figure 9:
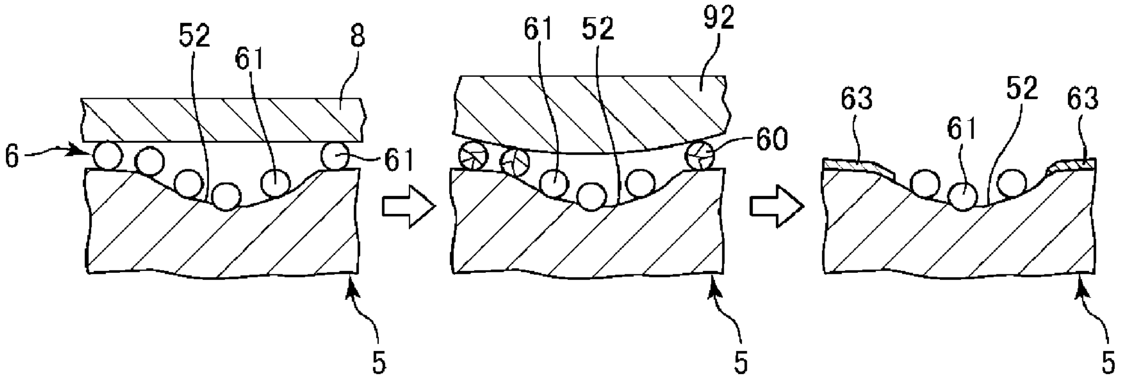
FIG. 9 is a schematic view showing the method for producing the insulator-coated soft magnetic powder shown in FIG. 2.
Figure 10:
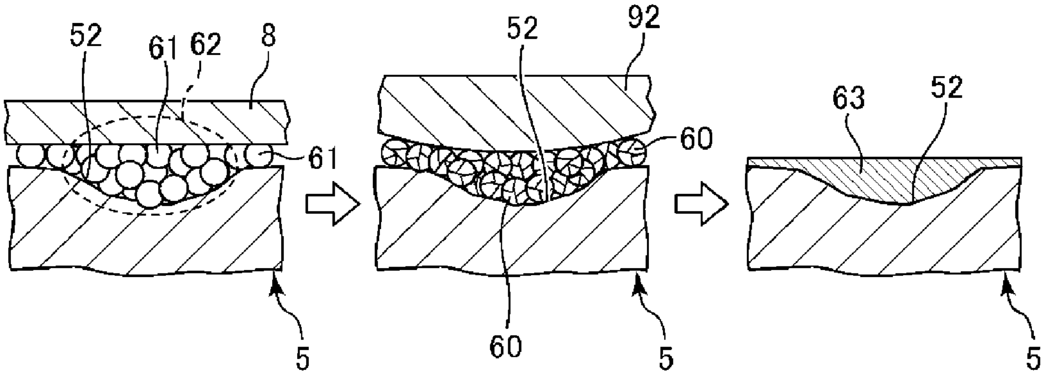
FIG. 10 is a schematic view showing the method for producing the insulator-coated soft magnetic powder shown in FIG. 2.

FIGS. 9 and 10 are schematic views showing the action of filling recesses 52 on the surfaces of the particles of the soft magnetic powder 5 with the molten material 63. FIG. 9 is a schematic view of a case where the ceramic powder 6 does not contain secondary particles 62, and FIG. 10 is a schematic view of a case where the ceramic powder 6 contains the secondary particles 62.

When the secondary particles 62 are not contained in the ceramic powder 6, as shown in FIG. 9, the ceramic powder 6 is composed of only primary particles 61. In this case, in the first compression bonding step S104, as shown in the left diagram in FIG. 9, the probability that the primary particles 61 are completely accommodated in the recesses 52 increases. Accordingly, the primary particles 61 accommodated in the recesses 52 are unlikely to be pulverized even when the primary particles 61 collide with the container 8 shown in FIG. 9. In addition, also in the second compression bonding step S106, as shown in the central diagram in FIG. 9, mechanical energy is not applied to the primary particles 61 accommodated in the recesses 52. As a result, even after the second compression bonding step S106, as shown in the right diagram in FIG. 9, the primary particles 61 are highly likely to remain. In this case, the insulating property of the insulator-coated soft magnetic powder 1 may decrease.

On the other hand, when the secondary particles 62 are contained in the ceramic powder 6, as shown in the left diagram in FIG. 10, even when the secondary particles 62 are accommodated in the recesses 52, the probability that the secondary particles 62 are completely accommodated decreases. Accordingly, the secondary particles 62 accommodated in the recesses 52 collide with the container 8 shown in FIG. 10 and are easily pulverized, and the probability that the recesses 52 is filled with the pulverized product 60 increases. In the second compression bonding step S106, as shown in the central diagram in FIG. 10, mechanical energy is easily applied to the pulverized product 60 by which the recesses 52 is filled. As a result, by the second compression bonding step S106, as shown in the right diagram in FIG. 10, the molten material 63 having a smooth surface is formed so as to fill the recesses 52.

An average particle size of the secondary particles 62 in the ceramic powder 6 is preferably 16 or more and 10000 or less, and more preferably 500 or more and 2000 or less, when an average particle size of the primary particles 61 is 1. Accordingly, it is possible to more reliably obtain the above-described effects.

A specific surface area of the soft magnetic powder 5 before being subjected to the first compression bonding step S104 is defined as S1, a specific surface area of the soft magnetic powder 5 after being subjected to the first compression bonding step S104 is defined as S2, and a specific surface area of the insulator-coated soft magnetic powder 1 produced by the present production method is defined as S3. At this time, it is preferable that S3<S1<S2. This relationship indicates that the pulverized product 60 is sufficiently formed by the first compression bonding step S104, and the molten material 63 is sufficiently formed by the second compression bonding step S106.

At this time, the specific surface area S3 is preferably 50% or more and 95% or less, and more preferably 60% or more and 90% or less of the specific surface area S1. By satisfying this relationship, the ceramic material is sufficiently melted, and the insulator-coated soft magnetic powder 1, in which the surfaces of the particles of the soft magnetic powder 5 are coated with a high coverage, is obtained. Such an insulator-coated soft magnetic powder 1 has a particularly high insulating property.

2.4. Heat Treatment Step

In the heat treatment step S108, the insulator-coated soft magnetic powder 1 is subjected to a heat treatment (annealing treatment) as necessary. By this heat treatment, strains remaining in the insulator-coated soft magnetic powder 1 is removed or reduced. Accordingly, a coercive force of the insulator-coated soft magnetic powder 1 is reduced.

The heat treatment can be expected to have effects of increasing an adhesion force between the insulating film 3 and the soft magnetic particle 2 and further smoothing the surface of the insulating film 3. When a specific surface area of the insulator-coated soft magnetic powder 1 after the heat treatment step S108 is defined as S4, it is preferable that S4<S3. With this relationship, the insulator-coated soft magnetic powder 1 having a particularly small specific surface area can be produced by the heat treatment step S108.

A heating temperature in the heat treatment is not particularly limited, and is preferably 600° C. or higher and 1200° C. or lower, and more preferably 900° C. or higher and 1100° C. or lower. A time for performing the heat treatment, that is, a holding time of the heating temperature is not particularly limited, and is preferably 10 minutes or longer and 10 hours or shorter, and more preferably 20 minutes or longer and 6 hours or shorter. By setting conditions of the heat treatment within the above ranges, strains can be sufficiently removed or reduced as compared with the case where the conditions of the heat treatment are out of the above ranges.

An atmosphere in which the heat treatment is performed is not particularly limited, and examples thereof include an oxidizing gas atmosphere containing oxygen gas, air, and the like, a reducing gas atmosphere containing hydrogen gas, ammonia decomposition gas, and the like, an inert gas atmosphere containing nitrogen gas, argon gas, and the like, and a reduced-pressure atmosphere obtained by reducing a pressure of any gas. Among these, a reducing gas atmosphere or an inert gas atmosphere is preferably used, and a reduced-pressure atmosphere is more preferably used. According to these atmospheres, it is possible to remove or reduce strains while preventing oxidation of the soft magnetic particle 2.

A device used for the heat treatment is not particularly limited as long as the above-described treatment conditions can be set, and a known electric furnace and the like can be adopted.

2.5. Effects of Method for Producing Insulator-Coated Soft Magnetic Powder According to Embodiment As described above, the method for producing the insulator-coated soft magnetic powder according to the embodiment includes the mixing step S102, the first compression bonding step S104, and the second compression bonding step S106. In the mixing step S102, the soft magnetic powder 5 and the ceramic powder 6 are mixed to obtain the mixture 7. In the first compression bonding step S104, the ceramic powder 6 is pulverized by applying mechanical energy to the mixture 7. In the second compression bonding step S106, after the first compression bonding step S104, mechanical energy larger than that in the first compression bonding step S104 is applied to the mixture 7 to fuse the pulverized ceramic powder 6 to the surfaces of the particles of the soft magnetic powder 5. Accordingly, the insulator-coated soft magnetic powder 1 is obtained.

As described above, in the production method, the process of applying the mechanical energy is divided into two processes. As a result, the molten material 63 of the ceramic powder 6 has a thin and uniform thickness, and the surface can be made smooth. As a result, it is possible to produce the insulator-coated soft magnetic powder 1 having a good insulating property derived from the ceramic material. In addition, even when there are irregularities on the surfaces of the particles of the soft magnetic powder 5, the recesses can be filled with the molten material 63. As a result, the insulator-coated soft magnetic powder 1 having a small specific surface area can be efficiently produced. Accordingly, the amount of the binder used for binding the insulator-coated soft magnetic particles 4 to each other can be reduced, and a magnetic element having high magnetic properties such as a magnetic permeability and a saturation magnetic flux density can be implemented.

The average particle size of the ceramic powder 6 is preferably smaller than the average particle size of the soft magnetic powder 5. It is easier for the ceramic powder 6 to be distributed around the particles of the soft magnetic powder 5 in the mixture 7. As a result, the ceramic powder 6 is easily pulverized in the first compression bonding step S104.

The average particle size of the soft magnetic powder 5 is preferably 1 μm or more and 50 μm or less, and the average particle size of the ceramic powder 6 is preferably 0.005% or more and 1.0% or less of the average particle size of the soft magnetic powder 5. Accordingly, even when the surfaces of the particles of the soft magnetic powder 5 have irregularities, an appropriate impact is easily applied to the ceramic powder 6 in the first compression bonding step S104. As a result, the ceramic powder 6 is more easily pulverized, and finally, the molten material 63 having a uniform film thickness is easily formed.

The ceramic powder 6 preferably contains the secondary particles 62 formed by the aggregation of the plurality of primary particles 61. Accordingly, even when the surfaces of the particles of the soft magnetic powder 5 have irregularities, the action of filling the recesses 52 with the secondary particles 62 is facilitated. As a result, the molten material 63 is formed so as to fill the recesses 52, and finally, the insulating film 3 having a smooth surface and a small specific surface area can be obtained.

It is preferable that each of the first compression bonding step S104 and the second compression bonding step S106 includes a treatment using a mechanochemical method. According to such a treatment, it is possible to appropriately generate a mechanical interaction between the soft magnetic powder 5 and the ceramic powder 6. Accordingly, the insulating film 3 can be formed without applying excessive strains to the soft magnetic powder 5.

The first compression bonding step S104 includes an operation of applying an acceleration to the mixture 7 as the treatment using the mechanochemical method. Further, the second compression bonding step S106 includes an operation of applying a shearing force to the mixture 7 as the treatment using the mechanochemical method.

By performing such an operation, it is possible to form the insulating film 3 having a particularly small specific surface area and a small and uniform thickness.

The specific surface area S3 of the insulator-coated soft magnetic powder 1 is preferably 50% or more and 95% or less of the specific surface area S1 of the soft magnetic powder 5. Accordingly, in the insulating film 3 included in the insulator-coated soft magnetic powder 1, the ceramic material is sufficiently melted, and the surfaces of the particles of the soft magnetic powder 5 is coated with a high coverage. Such an insulator-coated soft magnetic powder 1 has a particularly high insulating property.

3. Dust Core and Magnetic Element

Next, a dust core and a magnetic element according to the embodiment will be described.

The magnetic element according to the embodiment can be applied to various magnetic elements including a magnetic core, such as a choke coil, an inductor, a noise filter, a reactor, a transformer, a motor, an actuator, an electromagnetic valve, and a generator. The dust core according to the embodiment can be applied to a magnetic core included in these magnetic elements.

Hereinafter, two types of coil components will be representatively described as an example of the magnetic element.

3.1. Toroidal Type

First, a toroidal type coil component, which is an example of the magnetic element according to the embodiment, will be described.

Figure 11:
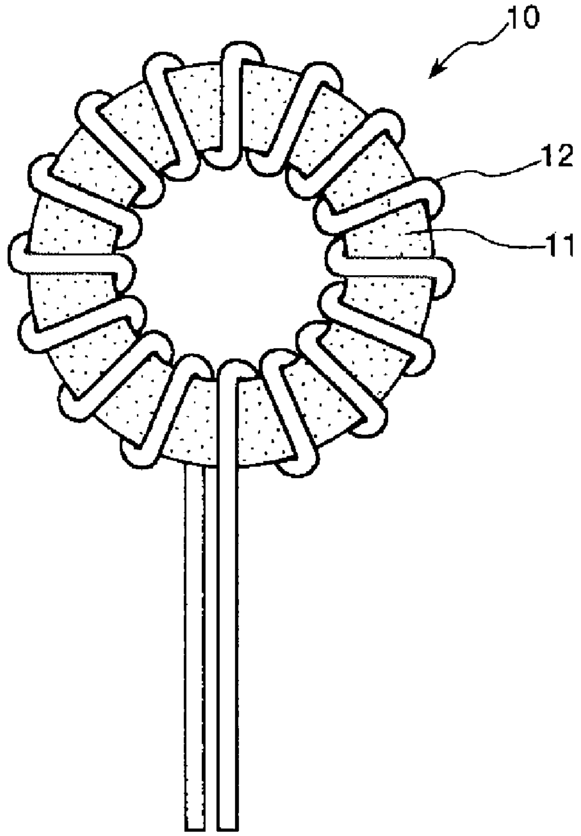
FIG. 11 is a plan view schematically showing a toroidal type coil component.

FIG. 11 is a plan view schematically showing the toroidal type coil component.

A coil component 10 shown in FIG. 11 includes a ring-shaped dust core 11 and a conductive wire 12 wound around the dust core 11. Such a coil component 10 is generally referred to as a toroidal coil.

The dust core 11 is obtained by mixing the insulator-coated soft magnetic powder according to the embodiment and a binder, supplying the obtained mixture to a mold, pressing and molding the mixture. That is, the dust core 11 is a powder compact containing the insulator-coated soft magnetic powder according to the embodiment. Such a dust core 11 can implement a magnetic element in which a specific surface area of the insulator-coated soft magnetic powder is small, a filling property is good, and an eddy current loss is low. Therefore, the coil component 10 including the dust core 11 has a low eddy current loss and high magnetic properties such as a magnetic permeability and a magnetic flux density. As a result, when the coil component 10 is mounted on an electronic device and the like, power consumption of the electronic device and the like can be reduced, and high performance and size reduction can be implemented.

Examples of a constituent material of the binder used for producing the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate. In particular, the constituent material of the binder is preferably a thermosetting polyimide or an epoxy-based resin. The resin materials are easily cured by being heated and have excellent heat resistance. Therefore, ease of producing the dust core 11 and heat resistance thereof can be improved. The binder may be added as necessary, and may be omitted.

A proportion of the binder to the insulator-coated soft magnetic powder slightly varies depending on target magnetic properties and mechanical properties, an allowable eddy current loss and the like of the dust core 11 to be produced, and is preferably about 0.5% by mass or more and 5.0% by mass or less, and more preferably about 1.0% by mass or more and 3.0% by mass or less. Accordingly, the coil component 10 having excellent magnetic properties can be obtained while particles of the insulator-coated soft magnetic powder are sufficiently bound to each other.

Various additives may be added to the mixture as necessary for any purpose.

Examples of a constituent material of the conductive wire 12 include a material having high conductivity, for example, a metal material including Cu, Al, Ag, Au, and Ni. An insulating film is provided on a surface of the conductive wire 12 as necessary.

A shape of the dust core 11 is not limited to the ring shape shown in FIG. 11, and may be, for example, a shape in which a part of a ring is missing, a shape whose shape in a longitudinal direction is linear, a sheet shape, or a film shape.

The dust core 11 may contain a soft magnetic powder other than the insulator-coated soft magnetic powder according to the above-described embodiment or a non-magnetic powder as necessary.

3.2. Closed Magnetic Circuit Type

Next, a closed magnetic circuit type coil component, which is an example of the magnetic element according to the embodiment, will be described.

Figure 12:
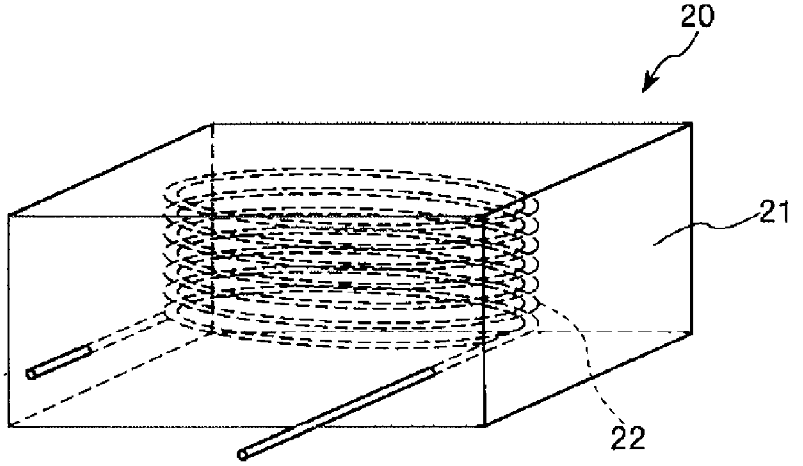
FIG. 12 is a transparent perspective view schematically showing a closed magnetic circuit type coil component.

FIG. 12 is a transparent perspective view schematically showing the closed magnetic circuit type coil component.

Hereinafter, the closed magnetic circuit type coil component will be described. In following description, differences from the toroidal type coil component will be mainly described, and description of similar matters is omitted.

As shown in FIG. 12, a coil component 20 according to the embodiment is formed by embedding a conductive wire 22 formed in a coil shape in a dust core 21. That is, the coil component 20 that is the magnetic element includes the dust core 21 containing the above-described insulator-coated soft magnetic powder, and is formed by molding the conductive wire 22 with the dust core 21. The dust core 21 has the same configuration as that of the dust core 11 described above. Accordingly, the coil component 20 that has a low eddy current loss and excellent magnetic properties can be implemented.

The coil component 20 in such a form can be easily obtained in a relatively small size. Therefore, when the coil component 20 is mounted on an electronic device and the like, power consumption of the electronic device and the like can be reduced, and high performance and size reduction can be implemented.

Since the conductive wire 22 is embedded in the dust core 21, a gap is less likely to be formed between the conductive wire 22 and the dust core 21. Therefore, vibration caused by magnetostriction of the dust core 21 can be prevented, and generation of noise due to the vibration can also be prevented.

A shape of the dust core 21 is not limited to the shape shown in FIG. 12, and may be a sheet shape, a film shape, and the like.

The dust core 21 may contain a soft magnetic powder other than the insulator-coated soft magnetic powder according to the above-described embodiment or a non-magnetic powder as necessary.

4. Electronic Device

Next, the electronic device including the magnetic element according to the embodiment will be described with reference to FIGS. 13 to 15.

Figure 13:
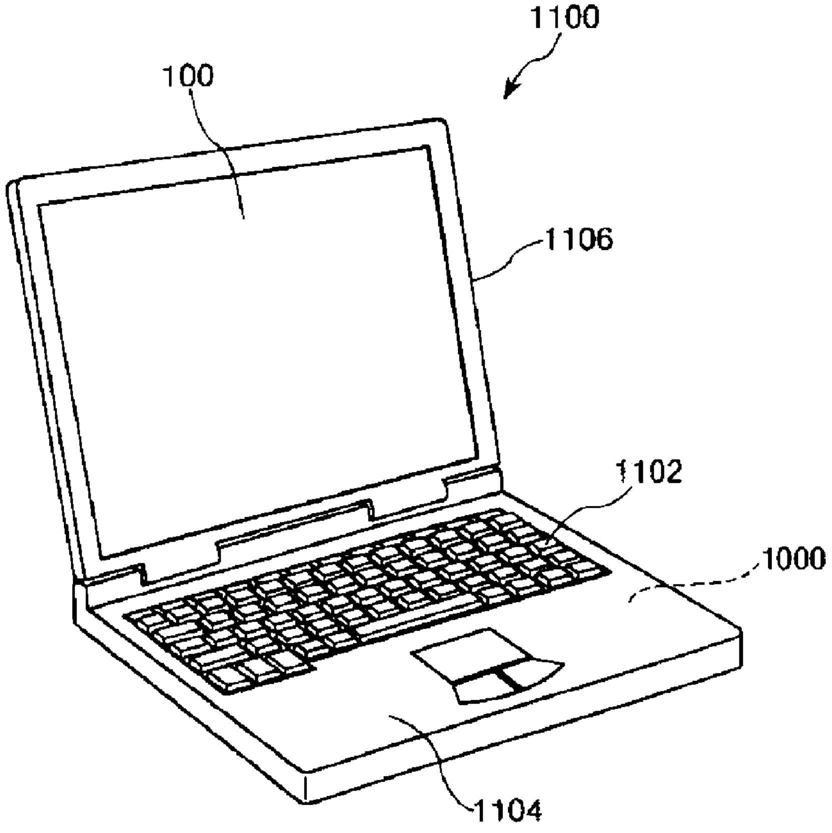
FIG. 13 is a perspective view showing a mobile personal computer which is an electronic device including a magnetic element according to the embodiment.

FIG. 13 is a perspective view showing a mobile personal computer which is the electronic device including the magnetic element according to the embodiment. A personal computer 1100 shown in FIG. 13 includes a main body 1104 including a keyboard 1102 and a display unit 1106 including a display 100. The display unit 1106 is rotatably supported by the main body 1104 via a hinge structure. Such a personal computer 1100 includes therein a magnetic element 1000 such as a choke coil or an inductor for a switching power supply, or a motor.

Figure 14:
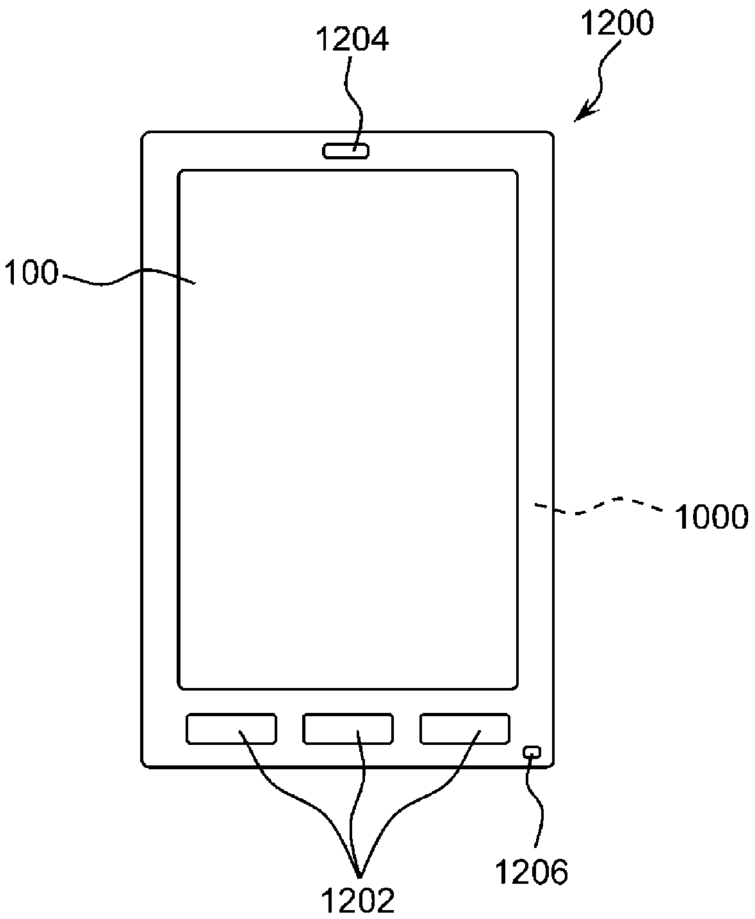
FIG. 14 is a plan view showing a smartphone which is an electronic device including the magnetic element according to the embodiment.

FIG. 14 is a plan view showing a smartphone which is the electronic device including the magnetic element according to the embodiment. A smartphone 1200 shown in FIG. 14 includes a plurality of operation buttons 1202, an earpiece 1204, and a mouthpiece 1206. The display 100 is disposed between the operation buttons 1202 and the earpiece 1204. Such a smartphone 1200 includes therein the magnetic element 1000 such as an inductor, a noise filter, or a motor.

Figure 15:
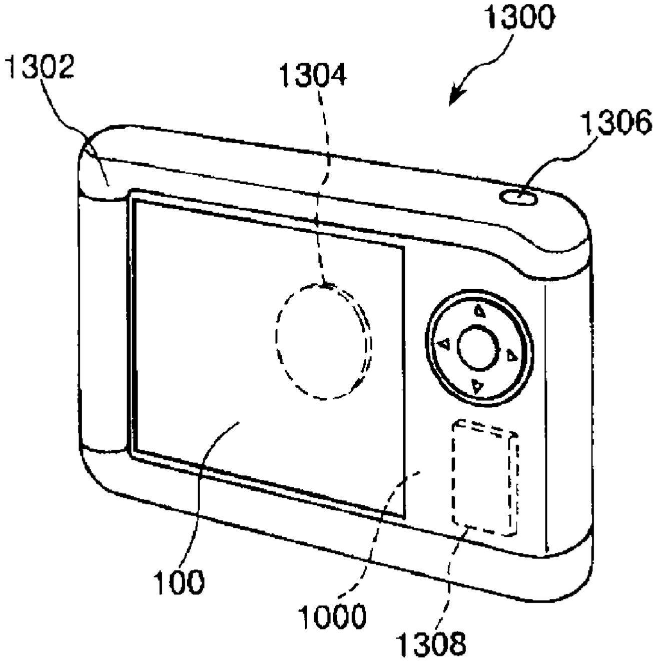
FIG. 15 is a perspective view showing a digital still camera which is an electronic device including the magnetic element according to the embodiment.

FIG. 15 is a perspective view showing a digital still camera which is the electronic device including the magnetic element according to the embodiment. A digital still camera 1300 photoelectrically converts an optical image of a subject by an imaging element such as a charge coupled device (CCD) so as to generate an imaging signal.

The digital still camera 1300 shown in FIG. 15 includes the display 100 provided at a rear surface of a case 1302. The display 100 functions as a finder which displays the subject as an electronic image. A light receiving unit 1304 including an optical lens, a CCD, and the like is provided on a front surface side of the case 1302, that is, on a back surface side in the drawing.

When a photographer confirms a subject image displayed on the display 100 and presses a shutter button 1306, a CCD imaging signal at this time is transferred to and stored in a memory 1308. Such a digital still camera 1300 also includes therein the magnetic element 1000 such as an inductor or a noise filter.

Examples of the electronic device according to the embodiment include, in addition to the personal computer in FIG. 13, the smartphone in FIG. 14, and the digital still camera in FIG. 15, a mobile phone, a tablet terminal, a watch, ink jet discharge devices such as an ink jet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measurement device, an ultrasonic diagnostic device, and an electronic endoscope, a fish finder, various measuring devices, instruments for a vehicle, an aircraft, and a ship, vehicle control devices such as an automobile control device, an aircraft control device, a railway vehicle control device, and a ship control device, and a flight simulator.

As described above, such an electronic device includes the magnetic element according to the embodiment. Accordingly, effects of the magnetic element, that is, a low eddy current loss and a high magnetic permeability can be provided, and performance improvement and size reduction of the electronic device can be implemented.

5. Vehicle

Next, a vehicle including the magnetic element according to the embodiment will be described with reference to FIG. 16.

Figure 16:
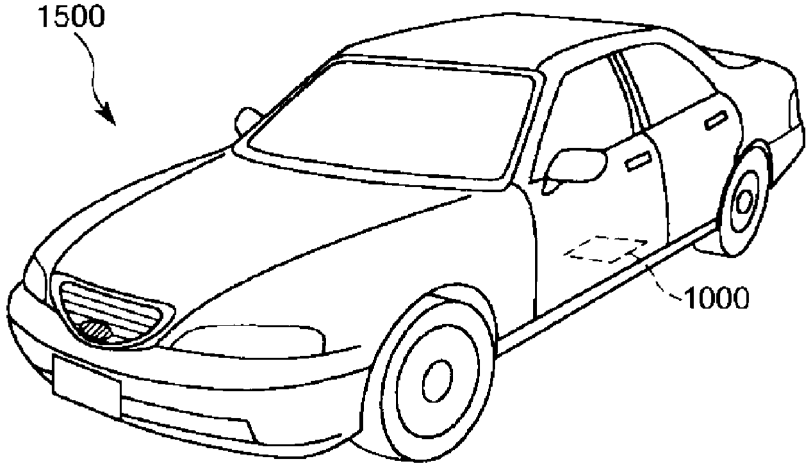
FIG. 16 is a perspective view showing an automobile which is a vehicle including the magnetic element according to the embodiment.

FIG. 16 is a perspective view showing an automobile which is the vehicle including the magnetic element according to the embodiment.

An automobile 1500 includes therein the magnetic element 1000. Specifically, the magnetic element 1000 is provided in various automobile components such as a car navigation system, an anti-lock brake system (ABS), an engine control unit, a battery control unit of a hybrid automobile or an electric automobile, a vehicle body posture control system, an electronic control unit (ECU) such as an automatic driving system, a driving motor, a generator, and an air conditioning unit.

As described above, such a vehicle includes the magnetic element according to the embodiment. Accordingly, the effects of the magnetic element, that is, a low eddy current loss and a high magnetic permeability can be provided, and performance improvement and size reduction of the device mounted on the vehicle can be implemented.

The vehicle according to the embodiment may be, for example, a motorcycle, a bicycle, an aircraft, a helicopter, a drone, a ship, a submarine, a railway vehicle, a rocket, or a spacecraft, in addition to the automobile shown in FIG. 16.

Although the method for producing the insulator-coated soft magnetic powder, the insulator-coated soft magnetic powder, the dust core, the magnetic element, the electronic device, and the vehicle according to the present disclosure have been described above based on the preferred embodiment, the present disclosure is not limited thereto.

For example, although a powder compact such as the dust core is described as an application example of the insulator-coated soft magnetic powder according to the present disclosure in the above embodiment, the application example is not limited thereto, and a magnetic device such as a magnetic fluid, a magnetic head, or a magnetic shielding sheet may also be used. The shapes of the dust core and the magnetic element are not limited to those shown in the drawings, and may be any shape.

Further, the method for producing the insulator-coated soft magnetic powder according to the present disclosure may be a method in which a step for any purpose as desired is added to the above-described embodiment.

EXAMPLES

Next, specific Examples of the present disclosure will be described.

6. Production of Insulator-Coated Soft Magnetic Powder 6.1. Example 1

First, a metal powder of a Fe—Si—Cr-based alloy produced by a water atomization method was prepared as a soft magnetic powder. The metal powder is a Fe-based alloy powder containing Fe as a main component and containing 4.5% by mass of Cr and 3.5% by mass of Si. Conditions of the soft magnetic powder are as shown in Table 1.

On the other hand, an aluminum oxide powder was prepared as a ceramic powder. Conditions of the ceramic powder are as shown in Table 1. The ceramic powder contained secondary particles, and a particle size ratio of the secondary particles to the primary particles was 1200.

Next, the metal powder and the aluminum oxide powder were mixed each other (mixing step). An addition amount of the aluminum oxide powder with respect to the metal powder was 1% by volume. The obtained mixture was charged into an accommodation object collision type device, and mechanical energy was applied thereto (first compression bonding step). Conditions of the first compression bonding step are as shown in Table 1.

Next, the mixture treated by the accommodation object collision type device was subsequently charged into an accommodation object compression type device, and mechanical energy was applied thereto (second compression bonding step). Accordingly, an insulator-coated soft magnetic powder was obtained. Conditions of the second compression bonding step are as shown in Table 1. An energy ratio is a ratio of the mechanical energy applied in the second compression bonding step when the mechanical energy applied in the first compression bonding step is 1. A specific surface area ratio is a ratio of a specific surface area after the completion of the second compression bonding step to a specific surface area of the soft magnetic powder.

Next, the insulator-coated soft magnetic powder was subjected to a heat treatment (heat treatment step). An electric furnace was used for the heat treatment, and treatment conditions were an argon gas atmosphere, a temperature increase rate of 5° C./min, a heating temperature of 900° C., and a heating time of 1 hour. After the completion of the heat treatment, the electric furnace was cooled to 25° C.

6.2. Examples 2 to 7

An insulator-coated soft magnetic powder was obtained in the same manner as in Example 1 except that production conditions were changed as shown in Table 1. In addition, the ceramic powder contained secondary particles except for some Examples, and the particle size ratio of the secondary particles to the primary particles was 700 to 1800.

6.3. Example 8

An insulator-coated soft magnetic powder was obtained in the same manner as in Example 1 except that a silicon oxide powder shown in Table 1 was used as the ceramic powder and the other conditions were as shown in Table 1.

6.4. Example 9

An insulator-coated soft magnetic powder was obtained in the same manner as in Example 1 except that a zirconium oxide powder shown in Table 2 was used as the ceramic powder and the other conditions were as shown in Table 2.

6.5. Example 10

An insulator-coated soft magnetic powder was obtained in the same manner as in Example 1 except that a titanium oxide powder shown in Table 2 was used as the ceramic powder and the other conditions were as shown in Table 2.

6.6. Example 11

An insulator-coated soft magnetic powder was obtained in the same manner as in Example 1 except that the ratio (energy ratio) of the mechanical energy applied in the second compression bonding step to the mechanical energy applied in the first compression bonding step was changed to a value shown in Table 2, and the other conditions were as shown in Table 2.

6.7. Example 12

An insulator-coated soft magnetic powder was obtained in the same manner as in Example 1 except that an acceleration in the first compression bonding step was changed to a value shown in Table 2, and the other conditions were as shown in Table 2.

6.8. Example 13

An insulator-coated soft magnetic powder was obtained in the same manner as in Example 1 except that the heat treatment step was omitted.

6.9. Comparative Example 1

An insulator-coated soft magnetic powder was obtained in the same manner as in Example 1 except that the second compression bonding step was omitted.

6.10. Comparative Example 2

An insulator-coated soft magnetic powder was obtained in the same manner as in Example 1 except that the first compression bonding step was omitted.

6.11. Comparative Example 3

The soft magnetic powder was directly used as a powder of Comparative Example 3 without forming an insulating film.

7. Evaluation of Insulator-Coated Soft Magnetic Powder 7.1. Specific Surface Area of Insulating Film The specific surface area of each of the powders of Examples and Comparative Examples was measured. Specifically, the specific surface area of each of the powder (soft magnetic powder) before the start of the first compression bonding step, the powder after the completion of the first compression bonding step, the powder after the completion of the second compression bonding step, and the powder after the completion of the heat treatment step was measured. The measurement results are shown in Tables 1 and 2.

The specific surface area of the powder after the completion of the second compression bonding step was defined as a "measured specific surface area". Then, a multiple value of the measured specific surface area with respect to a "theoretical specific surface area" calculated based on an average particle size and a true specific gravity of the soft magnetic powder was calculated as a "ratio of actually measured value to theoretical value". The calculation results are shown in Tables 1 and 2.

7.2. Average Thickness of Insulating Film

First, a cross section of the insulator-coated soft magnetic powder was observed using a scanning transmission electron microscope. Then, an average thickness of the insulating film was measured from the observed image. The measurement results are shown in Tables 1 and 2.

7.3. Coercive Force

A coercive force of each of the powders of Examples and Comparative Examples was measured using a VSM system TM-VSM1230-MHHL manufactured by Tamakawa Co., Ltd. serving as a magnetization measuring device. Then, the measured coercive force was evaluated according to the following criteria. The evaluation results are shown in Tables 1 and 2.

A: The coercive force is less than 5.0 [Oe].

B: The coercive force is 5.0 [Oe] or more and less than 8.0 [Oe].

C: The coercive force is 8.0 [Oe] or more and less than 10.0 [Oe].

D: The coercive force is 10.0 [Oe] or more.

7.4. Withstand Voltage and Insulation Resistance Value

A test piece was produced using each of the powders of Examples and Comparative Examples, and a withstand voltage and an insulation resistance value at the time of applying 100 V were measured for the obtained test piece. The measurement results are shown in Tables 1 and 2.

7.5. Filling Property

A filling property of each of the powders of Examples and Comparative Examples was evaluated by the following methods.

First, an apparent density of each of the powders of Examples and Comparative Examples was measured. Specifically, the apparent density was measured according to a metal powder-apparent density measuring method specified in JIS Z 2504:2012.

Next, a true density of each of the powders of Examples and Comparative Examples was measured by a constant volume expansion method. Then, a value obtained by dividing the apparent density by the true density was calculated as a filling rate [%], and each filling rate was evaluated according to the following criteria. The evaluation results are shown in Tables 1 and 2.

A: The filling rate is 40% or more.

B: The filling rate is 35% or more and less than 40%.

C: The filling rate is 30% or more and less than 35%.

D: The filling rate is less than 30%.

7.6. Magnetic Permeability

A test piece was produced using each of the powders of Examples and Comparative Examples, and a magnetic permeability of the obtained test piece was measured. Then, the measurement results were evaluated in according to the following evaluation criteria. The evaluation results are shown in Tables 1 and 2.

A: The magnetic permeability is 31 or more.

B: The magnetic permeability is 30 or more and less than 31.

C: The magnetic permeability is 29 or more and less than 30.

D: The magnetic permeability is less than 29.

TABLE 1

| | | | | Example 1 | Example 2 | Example 3 | Example 4 |
|---|---|---|---|---|---|---|---|
| Production condition | Soft magnetic powder | Soft magnetic material | — | Fe—Si—Cr-based alloy | | | |
| | | Average particle size | μm | 10 | 10 | 10 | 10 |
| | | Specific surface area | $m^2/g$ | 0.3 | 0.3 | 0.30 | 0.30 |
| | Ceramic powder | Type | — | $Al_2O_3$ | $Al_2O_3$ | $Al_2O_3$ | $Al_2O_3$ |
| | | Average particle size | nm | 15 | 5 | 8 | 8 |
| | | Particle size ratio to soft magnetic powder | % | 0.15 | 0.05 | 0.08 | 0.08 |
| | | Presence or absence of secondary particle | — | Presence | Presence | Presence | Presence |
| | | Presence or absence of surface treatment | — | Presence | Presence | Presence | Absence |
| | First compression bonding step | Acceleration | G | 10 | 10 | 10 | 10 |
| | | Vibration frequency | Hz | 50 | 50 | 50 | 50 |
| | | Specific surface area | $m^2/g$ | 0.31 | 0.34 | 0.32 | 0.34 |
| | Second compression bonding step | Energy ratio | — | 100 | 100 | 100 | 100 |
| | | Specific surface area | $m^2/g$ | 0.25 | 0.28 | 0.24 | 0.28 |
| | | Specific surface area ratio | % | 83 | 93 | 80 | 93 |
| | Heat treatment step | Atmosphere | — | Ar | Ar | Ar | $H_2$ |
| | | Heating temperature | ° C. | 900 | 900 | 800 | 1100 |
| | | Heating time | Hr | 1 | 4 | 8 | 8 |
| | | Specific surface area | $m^2/g$ | 0.22 | 0.19 | 0.21 | 0.25 |
| Evaluation result | Ratio of actually measured value to theoretical value of specific surface area | | times | 3.5 | 3.9 | 3.3 | 3.9 |
| | Average thickness of insulating film | | nm | 150 | 100 | 250 | 50 |
| | Coercive force | | — | A | A | B | A |
| | Withstand voltage | | V | 750 | 700 | 850 | 700 |
| | Insulation resistance value | | MΩ | More than 100,000 | More than 100,000 | More than 100,000 | More than 100,000 |
| | Filling property | | — | — | B | A | B |
| | Magnetic permeability | | — | — | B | A | A |

TABLE 1-continued

| | | | | Example 5 | Example 6 | Example 7 | Example 8 |
|---|---|---|---|---|---|---|---|
| Production condition | Soft magnetic powder | Soft magnetic material | — | Fe—Si—Cr-based alloy | | | |
| | | Average particle size | μm | 10 | 5 | 15 | 10 |
| | | Specific surface area | $m^2/g$ | 0.30 | 0.6 | 0.22 | 0.3 |
| | Ceramic powder | Type | — | $Al_2O_3$ | $Al_2O_3$ | $Al_2O_3$ | $SiO_2$ |
| | | Average particle size | nm | 8 | 2 | 50 | 8 |
| | | Particle size ratio to soft magnetic powder | % | 0.08 | 0.02 | 0.5 | 0.08 |
| | | Presence or absence of secondary particle | — | Absence | Presence | Presence | Presence |
| | | Presence or absence of surface treatment | — | Presence | Presence | Presence | Presence |
| | First compression bonding step | Acceleration | G | 10 | 10 | 10 | 10 |
| | | Vibration frequency | Hz | 50 | 50 | 50 | 50 |
| | | Specific surface area | $m^2/g$ | 0.38 | 0.45 | 0.25 | 0.35 |
| | Second compression bonding step | Energy ratio | — | 100 | 100 | 100 | 100 |
| | | Specific surface area | $m^2/g$ | 0.29 | 0.36 | 0.21 | 0.28 |
| | | Specific surface area ratio | % | 97 | 60 | 95 | 93 |
| | Heat treatment step | Atmosphere | — | Ar | Ar | $H_2$ | Ar |
| | | Heating temperature | ° C. | 1000 | 1000 | 1000 | 900 |
| | | Heating time | Hr | 8 | 8 | 8 | 1 |
| | | Specific surface area | $m^2/g$ | 0.27 | 0.29 | 0.2 | 0.26 |
| Evaluation result | Ratio of actually measured value to theoretical value of specific surface area | | times | 4.0 | 2.3 | 4.0 | 3.9 |
| | Average thickness of insulating film | | nm | 50 | 50 | 275 | 150 |
| | Coercive force | | — | A | A | A | A |
| | Withstand voltage | | V | 650 | 650 | 750 | 600 |
| | Insulation resistance value | | MΩ | 90,000 | 90,000 | More than 100,000 | 80,000 |
| | Filling property | | — | B | A | B | B |
| | Magnetic permeability | | — | B | B | B | B |

TABLE 2

| | | | | Example 9 | Example 10 | Example 11 | Example 12 |
|---|---|---|---|---|---|---|---|
| Production condition | Soft magnetic powder | Soft magnetic material | — | Fe—Si—Cr-based alloy | | | |
| | | Average particle size | μm | 10 | 10 | 10 | 10 |
| | | Specific surface area | $m^2/g$ | 0.3 | 0.3 | 0.30 | 0.30 |
| | Ceramic powder | Type | — | $ZrO_2$ | $TiO_2$ | $Al_2O_3$ | $Al_2O_3$ |
| | | Average particle size | nm | 20 | 10 | 15 | 15 |
| | | Particle size ratio to soft magnetic powder | % | 0.20 | 0.10 | 0.15 | 0.15 |
| | | Presence or absence of secondary particle | — | Presence | Presence | Presence | Presence |
| | | Presence or absence of surface treatment | — | Presence | Presence | Presence | Presence |
| | First compression bonding step | Acceleration | G | 10 | 10 | 10 | 5 |
| | | Vibration frequency | Hz | 50 | 50 | 50 | 100 |
| | | Specific surface area | $m^2/g$ | 0.32 | 0.35 | 0.31 | 0.3 |
| | Second compression bonding step | Energy ratio | — | 100 | 100 | 50 | 200 |
| | | Specific surface area | $m^2/g$ | 0.27 | 0.29 | 0.28 | 0.27 |
| | | Specific surface area ratio | % | 90 | 97 | 93 | 90 |
| | Heat treatment step | Atmosphere | — | Ar | Ar | Ar | Ar |
| | | Heating temperature | ° C. | 900 | 900 | 900 | 900 |
| | | Heating time | Hr | 1 | 1 | 1 | 1 |
| | | Specific surface area | $m^2/g$ | 0.24 | 0.28 | 0.25 | 0.25 |
| Evaluation result | Ratio of actually measured value to theoretical value of specific surface area | | times | 3.8 | 4.0 | 3.9 | 3.8 |
| | Average thickness of insulating film | | nm | 175 | 160 | 150 | 50 |
| | Coercive force | | — | A | A | A | A |
| | Withstand voltage | | V | 750 | 500 | 700 | 600 |
| | Insulation resistance value | | MΩ | 90,000 | 70,000 | More than 100,000 | 80,000 |
| | Filling property | | — | B | B | B | B |
| | Magnetic permeability | | — | A | B | A | A |

TABLE 2-continued

| | | | | Example 13 | Comparative Example 1 | Comparative Example 2 | Comparative Example 3 |
|---|---|---|---|---|---|---|---|
| Production condition | Soft magnetic powder | Soft magnetic material | — | Fe—Si—Cr-based alloy | | | |
| | | Average particle size | μm | 10 | 10 | 10 | 10 |
| | | Specific surface area | $m^2/g$ | 0.30 | 0.30 | 0.30 | 0.30 |
| | Ceramic powder | Type | — | $Al_2O_3$ | $Al_2O_3$ | $Al_2O_3$ | — |
| | | Average particle size | nm | 15 | 15 | 15 | — |
| | | Particle size ratio to soft magnetic powder | % | 0.15 | 0.15 | 0.15 | — |
| | | Presence or absence of secondary particle | — | Presence | Presence | Presence | — |
| | | Presence or absence of surface treatment | — | Presence | Presence | Presence | — |
| | First compression bonding step | Acceleration | G | 10 | 10 | — | — |
| | | Vibration frequency | Hz | 50 | 50 | — | — |
| | | Specific surface area | $m^2/g$ | 0.31 | 0.31 | — | — |
| | Second compression bonding step | Energy ratio | — | 100 | — | — | — |
| | | Specific surface area | $m^2/g$ | 0.25 | — | 0.4 | — |
| | | Specific surface area ratio | % | 83 | — | 133.3 | — |
| | Heat treatment step | Atmosphere | — | — | Ar | Ar | — |
| | | Heating temperature | ° C. | — | 900 | 900 | — |
| | | Heating time | Hr | — | 1 | 1 | — |
| | | Specific surface area | $m^2/g$ | — | 0.3 | 0.38 | — |
| Evaluation result | Ratio of actually measured value to theoretical value of specific surface area | | times | 3.5 | 4.3 | 5.6 | 4.2 |
| | Average thickness of insulating film | | nm | 150 | 150 | 150 | — |
| | Coercive force | | — | C | A | A | D |
| | Withstand voltage | | V | 800 | 350 | 400 | 150 |
| | Insulation resistance value | | MΩ | More than 100,000 | 61 | 4430 | 40 |
| | Filling property | | — | A | D | D | C |
| | Magnetic permeability | | — | A | B | B | A |

As is clear from Table 1 and Table 2, it is confirmed that the withstand voltage and the insulation resistance value of the produced test piece are higher in the powders of Examples than in the powders of Comparative Examples. In particular, it is found that performing both the first compression bonding step and the second compression bonding step is effective in improving insulating properties.

In each of the powders of Examples, the ratio of the actually measured value to the theoretical value of the specific surface area is sufficiently reduced as compared with each of the powders of Comparative Examples. It is also found that when this value is within a predetermined range, the filling property can be improved. From these results, it is recognized that each of the powders of Examples can reduce the amount of the binder used during compacting and molding, and as a result, a magnetic element having high magnetic properties can be produced.

Further, it is recognized that a powder having a low coercive force is obtained by the heat treatment step.

What is claimed is:

1. An insulator-coated soft magnetic powder comprising:

a soft magnetic powder; and an insulating film with which surfaces of particles of the soft magnetic powder are coated and which contains a ceramic material, wherein when an average particle size of the insulator-coated soft magnetic powder is d, a true specific gravity of the soft magnetic powder is ρ, a specific surface area obtained by $s=6/(\rho \cdot d)$ is a theoretical specific surface area s, and an actually measured specific surface area is a measured specific surface area S, the measured specific surface area S is 1.5 times or more and 4.0 times or less the theoretical specific surface area s, and the actually measured specific surface area is 0.15 $m^2/g$ or more and 0.29 $m^2/g$ or less.

2. The insulator-coated soft magnetic powder according to claim 1, wherein when a 2% by mass epoxy resin is mixed and pressurized at 294 MPa (3 $t/cm^2$) to obtain a withstand voltage measurement test piece, a withstand voltage of the withstand voltage measurement test piece is 500 V or more, and an insulation resistance value of the withstand voltage measurement test piece during application of 100 V is 1000 MΩ or more.

3. The insulator-coated soft magnetic powder according to claim 1, wherein a constituent material of the soft magnetic powder is a Fe—Si —Cr-based soft magnetic material, and when a 2% by mass epoxy resin is mixed and pressurized at 294 MPa (3 $t/cm^2$) to obtain a magnetic permeability measurement test piece, a magnetic permeability of the magnetic permeability measurement test piece is 31 or more.

4. A dust core comprising:

the insulator-coated soft magnetic powder according to claim 1.

5. A magnetic element comprising:

the dust core according to claim 4.

6. An electronic device comprising:

the magnetic element according to claim 5.

7. A vehicle comprising:

the magnetic element according to claim 5.

* * * * *